United States Patent
Watson et al.

(10) Patent No.: US 9,961,106 B2
(45) Date of Patent: May 1, 2018

(54) FILTERING LEGITIMATE TRAFFIC ELEMENTS FROM A DOS ALERT

(71) Applicant: Arbor Networks, Inc., Burlington, MA (US)

(72) Inventors: David Watson, Ann Arbor, MI (US); Anthony Danducci, Jerome, MI (US); Joanna Markel, Ann Arbor, MI (US); Willie Northway, Ann Arbor, MI (US); Steven Lyskawa, Ann Arbor, MI (US); James E. Winquist, Tpsilanti, MI (US)

(73) Assignee: Arbor Networks, Inc., Burlington, MA (US)

( * ) Notice: Subject to any disclaimer, the term of this patent is extended or adjusted under 35 U.S.C. 154(b) by 125 days.

(21) Appl. No.: 14/495,374

(22) Filed: Sep. 24, 2014

(65) Prior Publication Data

US 2016/0088013 A1    Mar. 24, 2016

(51) Int. Cl.
*H04L 29/06*    (2006.01)

(52) U.S. Cl.
CPC ...... *H04L 63/1458* (2013.01); *H04L 63/0227* (2013.01)

(58) Field of Classification Search
CPC .................. H04L 63/1458; H04L 63/0227
See application file for complete search history.

(56) References Cited

U.S. PATENT DOCUMENTS

| | | | | |
|---|---|---|---|---|
| 9,088,598 | B1* | 7/2015 | Zhang | H04L 63/1408 |
| 2002/0166063 | A1* | 11/2002 | Lachman, III | H04L 63/0263 726/23 |
| 2005/0249214 | A1* | 11/2005 | Peng | H04L 63/1458 709/224 |
| 2005/0289219 | A1* | 12/2005 | Nazzal | H04L 63/1441 709/203 |
| 2007/0214503 | A1* | 9/2007 | Shulman | G06F 11/2257 726/22 |
| 2011/0083179 | A1* | 4/2011 | Lawson | H04L 63/1458 726/22 |
| 2011/0126136 | A1* | 5/2011 | Abella | H04L 43/028 715/764 |
| 2014/0380457 | A1* | 12/2014 | Cassell | H04L 63/0236 726/13 |

* cited by examiner

*Primary Examiner* — Mary Li
(74) *Attorney, Agent, or Firm* — Locke Lord LLP; Scott D. Wofsy; Christopher J. Capelli (57) ABSTRACT

A method for monitoring traffic flow in a network is provided. A network monitoring probe monitors one or more network traffic flow parameters to detect a denial of service attack. In response to detecting the denial of service attack, a first set of data representing the denial of service attack alert is displayed. Filtering criteria are received from a user. The filtering criteria include at least one of the network flow parameters identified as legitimate network traffic. A second set of data is generated and displayed based on the filtering criteria.

18 Claims, 8 Drawing Sheets

FILTERING LEGITIMATE TRAFFIC ELEMENTS FROM A DOS ALERT

FIELD OF THE INVENTION

The present invention relates to protecting networks, and more particularly, to displaying information related to a possible Denial Of Service (DoS) attack in a filtered format.

BACKGROUND OF THE INVENTION

As businesses become increasingly dependent on computerized communications, businesses concurrently become increasingly vulnerable to attacks on the underlying computer infrastructure. Mere blocking of computer attacks may prevent an immediate problem, but the ability to monitor details and trends of computer attacks would greatly assist network administrators in anticipating and planning for future attacks.

Accordingly, there is an unmet need to monitor computer network traffic patterns, such as computer attacks, and provide network administrators a dynamically configurable interface that allows them to quickly navigate and filter through computerized attacks.

SUMMARY OF THE INVENTION

The purpose and advantages of the below described illustrated embodiments will be set forth in and apparent from the description that follows. Additional advantages of the illustrated embodiments will be realized and attained by the devices, systems, and methods particularly pointed out in the written description and the claims herein, as well as from the drawings.

In accordance with a purpose of the illustrated embodiments, in one aspect, a method for monitoring traffic flow in a network is provided. A network monitoring probe monitors one or more network traffic flow parameters to detect a denial of service attack. In response to detecting the denial of service attack, a first set of data representing the denial of service attack alert is displayed. Filtering criteria are received from a user. The filtering criteria include at least one of the network flow parameters identified as legitimate network traffic. A second set of data is generated and displayed based on the filtering criteria.

In another aspect, a computer program product for monitoring traffic flow in a network is provided. The computer program product includes one or more computer-readable storage devices and a plurality of program instructions stored on at least one of the one or more computer-readable storage devices. The plurality of program instructions includes program instructions to monitor one or more network traffic flow parameters to detect a denial of service attack. The plurality of program instructions further includes program instructions to display a first set of data representing the denial of service attack alert. The plurality of program instructions further includes program instructions to receive filtering criteria from a user. The filtering criteria include at least one of the network flow parameters identified as legitimate network traffic. The plurality of program instructions further includes program instructions to generate and display a second set of data based on the filtering criteria.

BRIEF DESCRIPTION OF THE DRAWINGS

So that those having ordinary skill in the art, to which the present embodiments pertain, will more readily understand how to employ the novel system and methods, certain illustrated embodiments thereof will be described in detail herein-below with reference to the drawings, wherein.

DETAILED DESCRIPTION OF CERTAIN EMBODIMENTS

The below illustrated embodiments are directed to systems and methods for monitoring traffic flow in a network. It is to be appreciated the below illustrated embodiments are not limited in any way to what is shown, as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the certain illustrated embodiments. Also, the flow charts and methods described herein do not imply either required steps or a required order to the steps, and it is contemplated herein that the illustrated embodiments and processes may be implemented in any order and/or combination that is practicable.

Unless defined otherwise, all technical and scientific terms used herein have the same meaning as commonly understood by one of ordinary skill in the art relating to the below illustrated embodiments. Although any methods and materials similar or equivalent to those described herein can also be used in the practice or testing of the below illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" may include a plurality of such stimuli and reference to "the signal" may include reference to one or more signals and equivalents thereof as known to those skilled in the art.

It is to be appreciated the certain embodiments described herein may be utilized in conjunction with a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be executed by a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the certain embodiments described herein. Thus the certain embodiments are not to be understood to be limited by what has been particularly shown and described, except as indicated by the appended claims. As used herein, a "flow" is generally defined as a stream (unidirectional or bi-directional) of packets traveling between two points in a network that all have the same characteristics. Nevertheless, a flow may include only a single packet sent from one point to another point in a network.

The methods and systems described herein allow users to, in an exemplary use, efficiently display and manipulate information describing DoS attacks. In one embodiment, in response to detecting a potential DoS attack, a first set of data representing a DoS attack alert is displayed. This data can be filtered according to user-specified filtering criteria. For example, users may filter out network flow parameters identified as legitimate network traffic. A second set of data is generated based on the filtering criteria.

Figure 1:
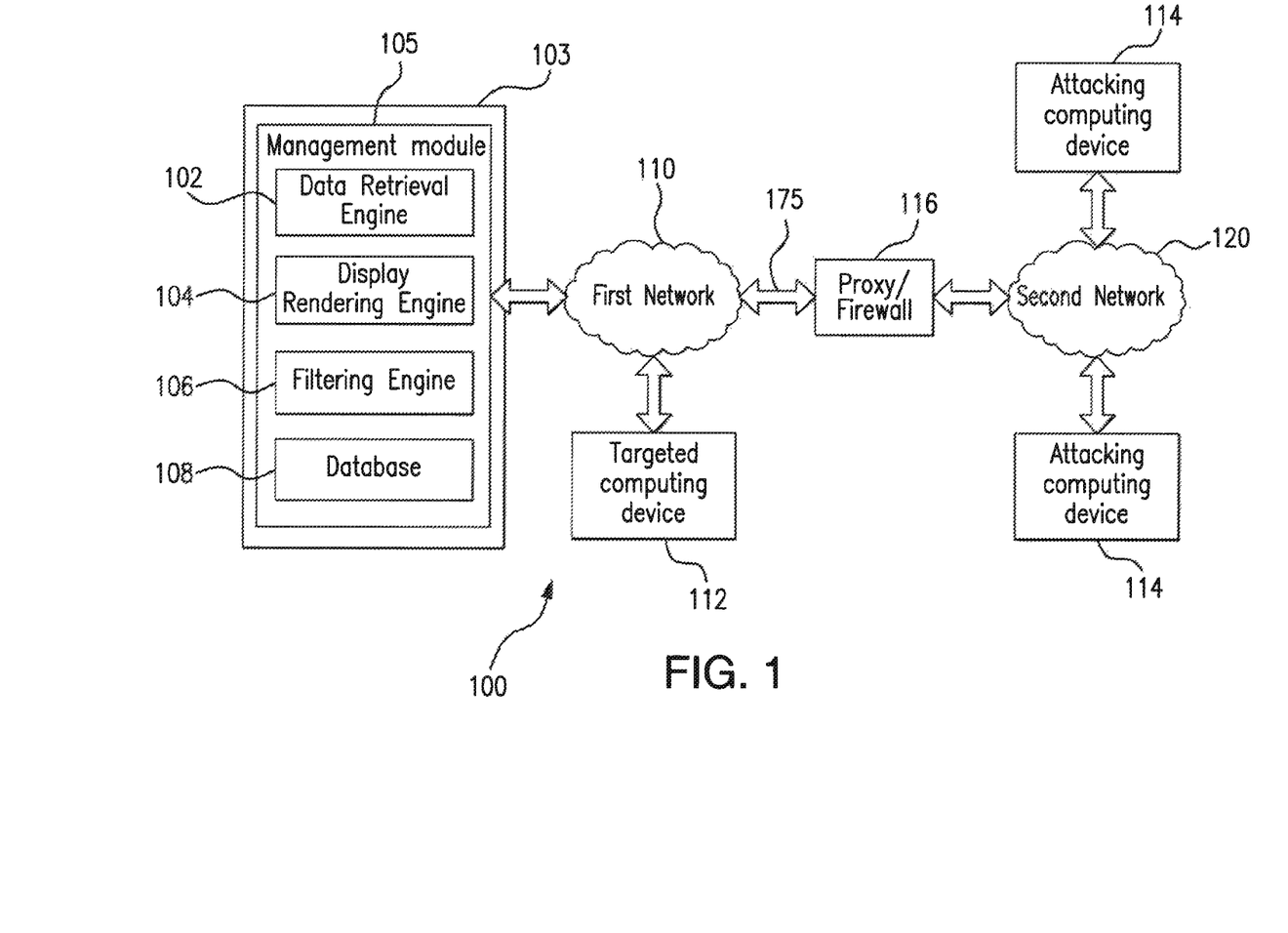
FIG. 1 illustrates a system diagram of an exemplary embodiment of a system for monitoring traffic flow in a network.

Referring to FIG. 1, a hardware diagram depicting an environment 100 in which the processes described herein can be executed is provided for exemplary purposes. In one embodiment, environment 100 includes management module 105, networks 110 and 120, communication links 175, a firewall-proxy combination 116, originating computing devices 114, and a targeted computing device 112. In the illustrated embodiment, management module 105 runs on a monitoring computer 103. Monitoring computer 103 may be adapted to execute any operating system including UNIX, Windows or any other suitable operating system. Management module 105 includes data retrieval engine 102, display rendering engine 104, filtering engine 106 and a database 108. Data retrieval engine 102 may be configured to interact with database 108 responsive to user's interaction with display rendering engine 104. In an embodiment, rendering engine 104 is configured to display monitoring information in graphical format (e.g., line graphs, bar graphs, etc.) on a display device via a Graphical User Interface (GUI). In one embodiment, filtering engine 130 may be configured to retrieve the subset of data describing DoS attacks that match configurable criteria from database 108.

In an embodiment illustrated in FIG. 1, targeted computing device 112 connected to the first network 110 represents a device and/or computer which is subject to attack by one or more attacking computing devices 114 connected to the second network 120. Data transfer is controlled between first network 110 and second network 120 by a firewall-proxy combination 116.

Although FIG. 1 shows the firewall-proxy combination 116 "in front of" first network 110 ("in front of" representing that the firewall-proxy combination is between first network 110 and second network 120) and management module 105 behind and/or within first network 110, it is contemplated herein that firewall-proxy combination 116 and management module 105 may be placed anywhere as would be recognized by those skilled in the art, including, for exemplary purposes only and without limitation, firewall-proxy combination 116 and management module 105 being functionally combined into a single operating piece of electronics.

Figure 2:
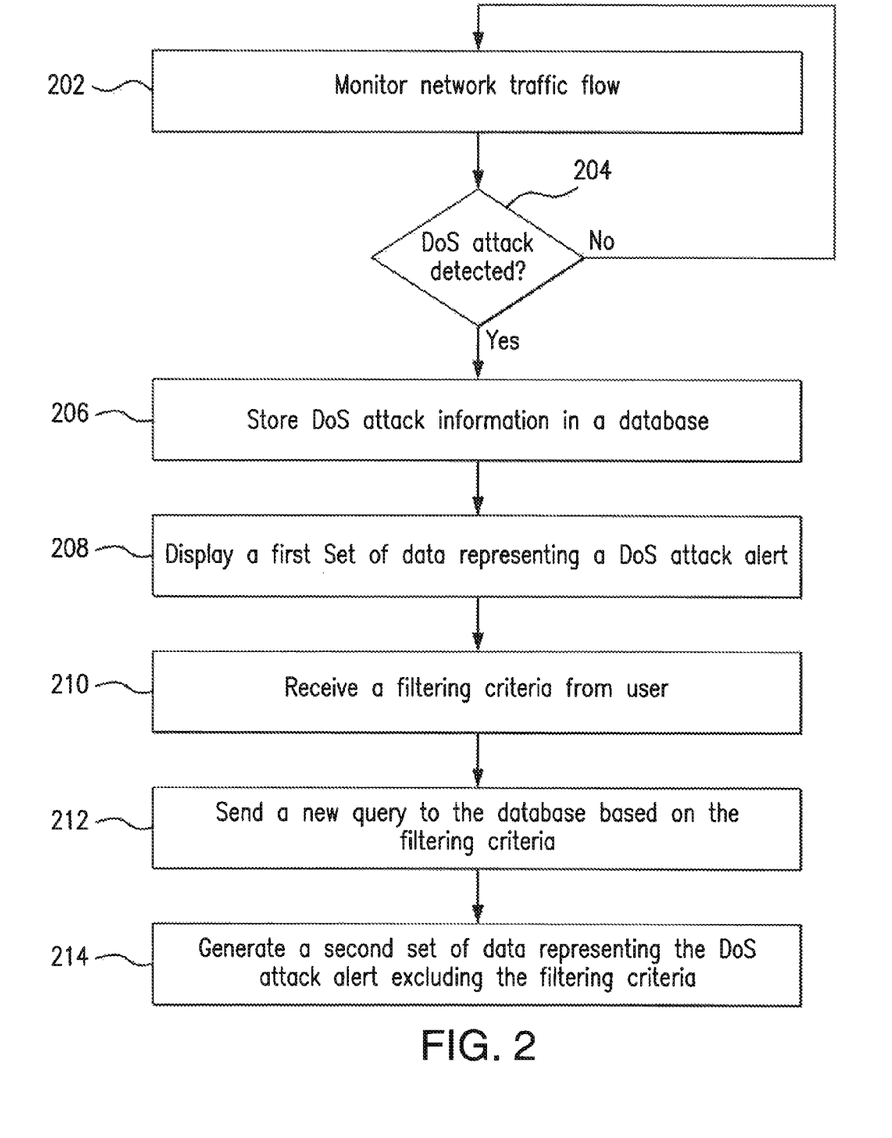
FIG. 2 is a flowchart of operational steps of the monitoring system of FIG. 1, in accordance with an illustrative embodiment of the present invention.

Turning to FIG. 2, illustrated therein is a flowchart of exemplary operational steps of management module 105 of FIG. 1, in accordance with an illustrative embodiment of the present invention. Before turning to description of FIG. 2, it is noted that the flow diagram in FIG. 2 shows example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

It is contemplated that certain embodiments of management module 105 described herein are capable to continually monitor network traffic flow over a wide range of operating conditions. Management module 105 can also analyze the monitored data in real-time and provide an assessment of the performance of a particular node (i.e., targeted computing device 112) or an entire network (i.e., first network 110). Accordingly, at 202, management module 105 monitors traffic that passes through firewall-proxy combination 116 and collects a plurality of statistics related to network data flow. In an embodiment of the present invention, management module 105 analyzes network traffic statistics to identify malicious network traffic.

At 204, management module 105 may analyze network traffic statistics until it detects malicious traffic flows. Several methods can be used separately or in combination to identify, malicious traffic flows. For example, management module 105 can detect DoS attacks and identify malicious flows or source addresses using at least one or more of the following methods including: analyzing packet ratios of TCP-like traffic; analyzing "repressor" traffic for particular types of normal traffic; performing TCP handshake analysis; performing various types of packet analysis; and logging/historical analysis.

According to an embodiment of the present invention, in response to detecting a DoS attack (step 204, yes branch), management module 105 may store DoS attack information in database 108. In an embodiment, this information may include statistical information on network traffic and statistical information on network packets obtained by management module 105, for example via a plurality of network sensors/probes. In addition, this step may involve management module 105 processing the collected information into time-series data on the periodic frequency of occurrence, and storing the time-series data in database 108.

Figure 3:
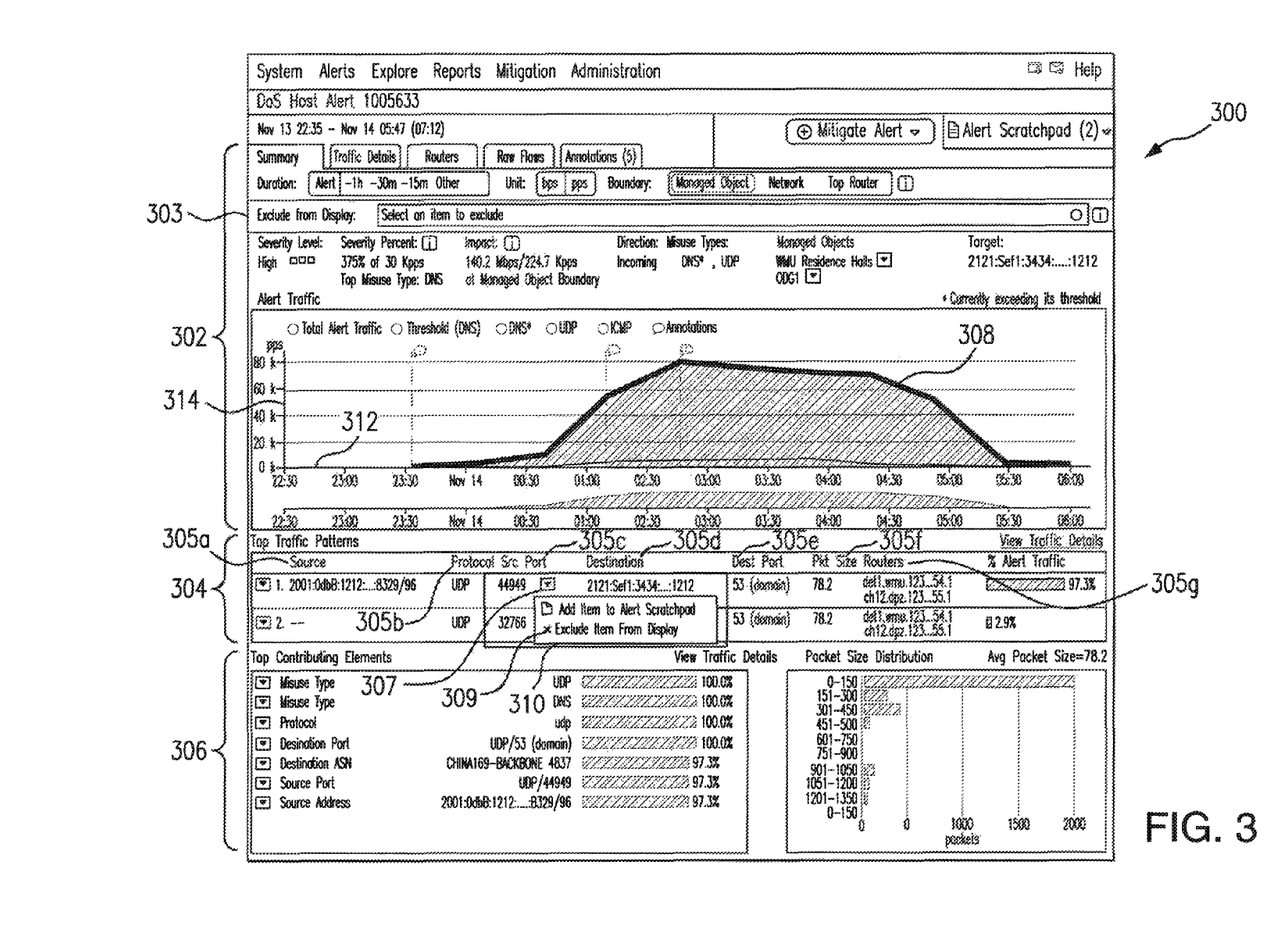
FIG. 3 is a diagram illustrating exemplary user interface screenshot of a page used for reporting DoS attack alert, in accordance with an embodiment of the present invention.

Next, at 208, management module 205, via GUI of display rendering engine 104, preferably generates and displays a first set of data representing a DoS attack alert information retrieved by data retrieval engine 102, according to an embodiment of the present invention. FIG. 3 is a diagram illustrating exemplary user interface screenshot of a page 300 used for reporting DoS attack alert, in accordance with an embodiment of the present invention. In this illustrated embodiment, page 300 may be divided into three sections: a summary section 302, a top traffic patterns section 304 and a top contributing elements section 306.

In one embodiment, summary section 302 may include information such as, but not limited to, DoS alert duration, severity level, IP address of the targeted computing device 112, and the like. In addition, at least some of network traffic flow data may be presented in a graphical format. FIG. 3 illustrates an exemplary line graph 308 depicting the relationship of packet volume and time for a particular protocol and for a predetermined time period, according to an embodiment of the present invention. The X-axis 312 represents the time; the Y-axis 314 represents message volume. In one embodiment, the time is measured in minutes, with one unit of time on the X-axis 312 being equal to 30 minutes; the message volume is measured in packets/second (pps).

Top traffic patterns section 304 may list most active nodes and for each node management module 105 may present information related to a plurality of network traffic flow parameters. In one embodiment, the network flow parameters 305 may include information such as an IP address of a traffic source 305a, protocol 305b, source port 305c, IP address of traffic destination 305d, destination port 305e, packet size 305f and routers identification information 305g. Top contributing elements section 306 may list a sorted list of network flow parameters 305 in accordance to their observable contribution to DoS attack.

The collective information presented in FIG. 3 is consistent with previously proposed DoS attack detection approaches which primarily rely on monitoring the total volume of traffic that is received by the targeted computing device. A major drawback of these approaches is that they do not provide a way to differentiate DoS attacks from other legitimate events. At least in some cases, due to the inherently bursty nature of network traffic, a sudden increase of traffic can be mistaken for an attack. Moreover, some persistent increases in traffic may not be attacks, but actually "flash crowd" events, where many legitimate users attempt to access one particular node at the same time.

Various embodiments of the present invention provide a new approach of monitoring network traffic, which enables users, such as network operators, to filter out information related to one or more network flow parameters that represents legitimate network traffic. Referring back to FIG. 2, after displaying first data set on DoS attack alert screen 300, at 210, management module 105 preferably enables users to enter filtering criteria by interacting with one or more sections of the DoS attack alert page 300. As shown in FIG. 3, in one embodiment a user may filter information presented on the DoS attack alert page 300 through the use of drop-down menus. For example, if users know that all traffic originating at port 44949 at a particular network node constitutes legitimate traffic, they may prefer to exclude that information from the DoS attack alert page 300 by using drop-down menu 307 corresponding to source port "44949". In response, management module 105 may present a designated pop-up menu 310, which may present a menu option 309 enabling users to exclude the selected network flow parameter from information presented on DoS attack alert page 300. In various embodiments, pop-up menu 310 may include some additional options related to filtering criteria. Furthermore, users may add more network flow parameters to the filtering criteria through the use of corresponding drop-down menus, for example.

Figure 4:
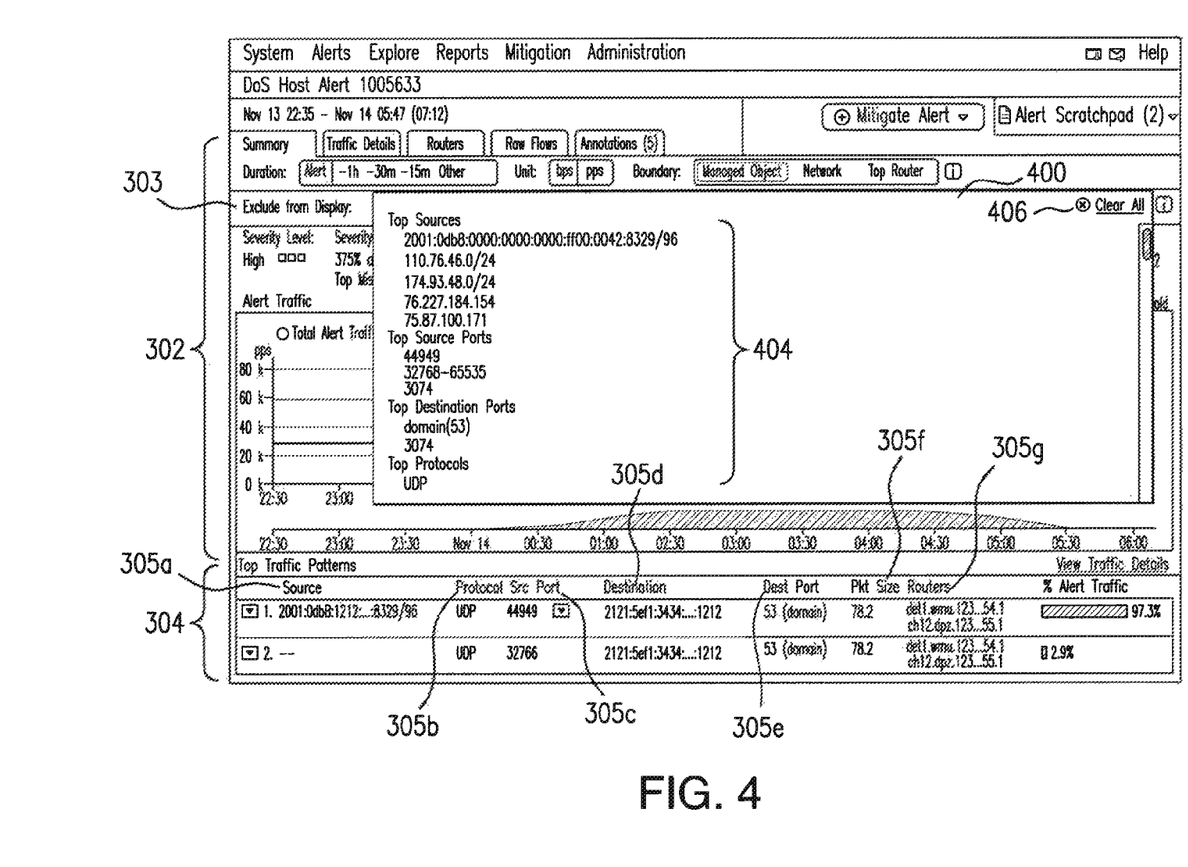
FIG. 4 is a diagram illustrating exemplary user interface screenshot of the page of FIG. 3 with an exemplary traffic element search list viewable, according to an alternative embodiment of the present invention.

FIG. 4 is a diagram illustrating exemplary user interface screenshot of page 300 used for reporting DoS alert attack with an exemplary filtering criteria search list viewable, in accordance with an alternative embodiment of the present invention. In this embodiment, users may filter information presented on the DoS attack alert page 300 through the use of designated pop-up window 400 containing a navigable list 404 of network flow parameters. In one embodiment, management module 105 may populate navigable list 404 based on information retrieved by data retrieval engine 102 from database 108. For example, data retrieval engine 102 may request information related to the most active flows, flows with the largest amount of traffic. In addition, management module 105 may categorize retrieved data based on corresponding network flow parameters. As illustrated in FIG. 4, navigable list 404 may include most active source and destination IP addresses, most active source and destination ports, most active protocols, and the like. For lists containing large numbers of network elements, management module 105 may utilize scrolling capability. For example, pop-up window 400 may include a scroll bar to allow a user to quickly navigate through a large list of items presented on the display by dragging a "thumb" icon along the scroll bar. As discussed above in conjunction with FIG. 3, users may desire to filter out particular network flow parameters/elements that correspond to legitimate network traffic. For example, when the item desired to be excluded from the DoS alert data is displayed within a viewable portion of pop-up window 400 it may be selected by traversing the mouse to highlight the desired item followed by a left click. It is noted that multiple item selection as well as inclusive selection of contiguous items between the currently illuminated and the previously selected item may be generally accomplished by well-known keyboard operations for selecting multiple menu items and/or data. Pop-up window 400 may further provide a menu or toolbar which includes a Clear All button 406 to remove all selected items from the filtering criteria.

Figure 5:
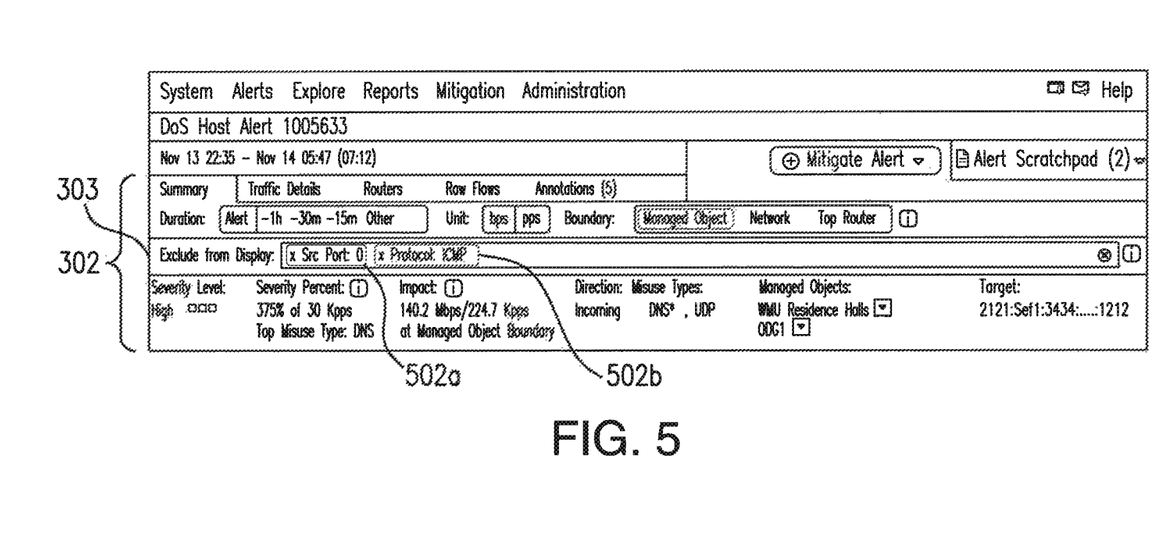
FIG. 5 is a diagram of a portion of the page of FIGS. 3 and 4 with exemplary filtering criteria viewable, according to an embodiment of the present invention.

According to an embodiment of the present invention, in response to obtaining filtering criteria from a user, management module 105 may update summary section 302 to reflect the selected filtering criteria. FIG. 5 is a diagram of a portion of the exemplary user interface screenshots of FIGS. 3 and 4 with exemplary filtering criteria viewable, according to an illustrative embodiment of the present invention. As shown in FIG. 5, summary section 302 may include designated sub-section 303 for presenting selected filtering criteria. For instance, filtering criteria sub-section 303 may include graphical elements 502a-502b representing each value (e.g., source port 0, protocol ICMP, etc.) of one or more network flow parameters selected by a user.

Figure 6:
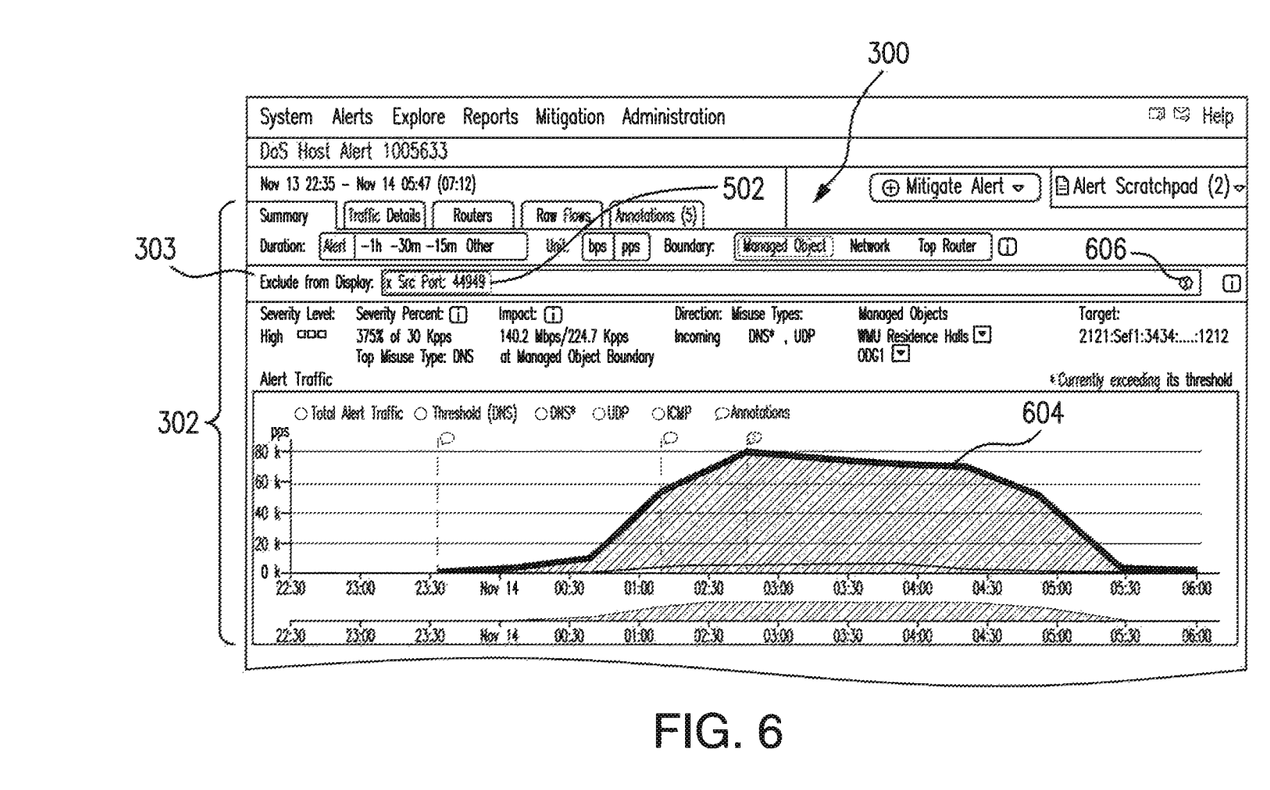
FIG. 6 is a diagram illustrating the page of FIGS. 3 and 4 regenerated after application of user selected filtering criteria, in accordance with an embodiment of the present invention.

Referring back to FIG. 2, after obtaining the filtering criteria from a user via either drop-down menus 307 or pop-up window 400, management module 105 may pass these filtering criteria to filtering engine 106. According to an embodiment of the present invention, at 212, filtering engine 106 may issue a new query responsive to the user-provided filtering criteria. At 214, management module 105 preferably regenerates and displays DoS attack alert page 300 with the selected data being excluded. FIG. 6 is a diagram illustrating the page of FIGS. 3 and 4 regenerated after application of user selected filtering criteria, in accordance with an embodiment of the present invention. In this case, summary section 302 of page 300 includes a second line graph 604 generated based on user-selected filtering criteria. In other words, second line graph 604, as compared to first line graph 308 shown in FIG. 3, excludes data corresponding to selected network flow parameters value(s) 502. Further, in this illustrative embodiment, DoS attack alert page 300 includes an additional section 602 that presents information related to routers being affected by the corresponding DoS attack. It is contemplated herein that data presented in other sections of DoS attack alert page 300 of FIG. 6 may also reflect filtering criteria corresponding to legitimate network flow traffic. In some embodiments, filtering criteria sub-section 303 of DoS attack alert page 300 may include a GUI component, for example, a button 606 providing for user removing the filtering criteria 502 and re-displaying the unfiltered data. Advantageously, various embodiments of the present invention enable users monitoring live network traffic to focus on malicious traffic only, thus making it easier to diagnose and/or mitigate DoS attacks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
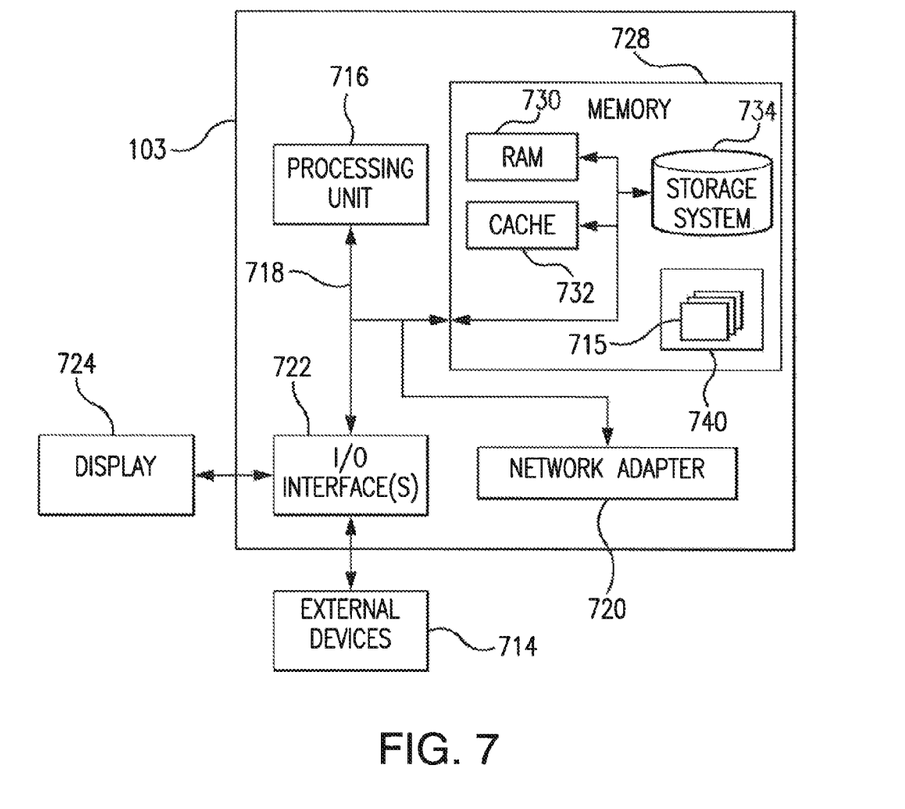
FIG. 7 is a block diagram illustrating a typical monitoring server that may be employed to implement processing functionality described herein, according to some embodiments.

Embodiments of network monitoring system may be implemented or executed by centralized data management servers comprising one or more computer systems. One such monitoring server 103 is illustrated in FIG. 7. In various embodiments, monitoring server 103 may be a server, a mainframe computer system, a workstation, a network computer, a desktop computer, a laptop, or the like.

Monitoring server 103 is only one example of a suitable system and is not intended to suggest any limitation as to the scope of use or functionality of embodiments of the invention described herein. Regardless, monitoring server 103 is capable of being implemented and/or performing any of the functionality set forth hereinabove.

Monitoring server 103 may be described in the general context of computer system-executable instructions, such as program modules, being executed by a computer system. Generally, program modules may include routines, programs, objects, components, logic, data structures, and so on that perform particular tasks or implement particular abstract data types. Monitoring server 103 may be practiced in distributed data processing environments where tasks are performed by remote processing devices that are linked through a communications network. In a distributed data processing environment, program modules may be located in both local and remote computer system storage media including memory storage devices.

Monitoring server 103 is shown in FIG. 7 in the form of a general-purpose computing device. The components of monitoring server 103 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Monitoring server 103 typically includes a variety of computer system readable media. Such media may be any available media that is accessible by monitoring server 103, and it includes both volatile and non-volatile media, removable and non-removable media.

System memory 728 can include computer system readable media in the form of volatile memory, such as random access memory (RAM) 730 and/or cache memory 732. Monitoring server 103 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 715, such as data retrieval engine 102, display rendering engine 104 and filtering engine 106, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 715 generally carry out the functions and/or methodologies of embodiments of the invention as described herein.

Monitoring server 103 may also communicate with one or more external devices 714 such as a keyboard, a pointing device, a display 724, etc.; one or more devices that enable a user to interact with monitoring server 103; and/or any devices (e.g., network card, modem, etc.) that enable monitoring server 103 to communicate with one or more other computing devices. Such communication can occur via Input/Output (I/O) interfaces 722. Still yet, monitoring server 103 can communicate with one or more networks such as a local area network (LAN), a general wide area network (WAN), and/or a public network (e.g., the Internet) via network adapter 720. As depicted, network adapter 720 communicates with the other components of monitoring server 103 via bus 718. It should be understood that although not shown, other hardware and/or software components could be used in conjunction with monitoring server 103. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for monitoring traffic in a network, the method comprising:
monitoring, by a network monitoring probe, one or more network traffic flow parameters to detect a denial of service attack;
displaying a first set of data in a graphical user interface (GUI), in response to detecting the denial of service attack, the first set of data representing a denial of service attack alert, wherein the denial of service attack alert comprises at least a first section representing alert summary information, a second section representing top traffic patterns associated with the denial of service attack alert, and a third section representing top contributing network elements associated with the denial of service attack alert, wherein the first section comprises at least alert duration, alert severity level and an IP address of the device targeted by the attack, and wherein the GUI includes one or more user interface control components;
dynamically receiving from a user, using the one or more user interface control components, filtering criteria comprising at least one of the one or more network traffic flow parameters identified as legitimate network traffic; and
generating and displaying in the GUI a second set of data representing the denial of service attack alert based on the filtering criteria.

2. The computer-implemented method of claim 1, wherein the first and second sets of data include one or more graphs representing the relationship of network traffic volume and time for a predetermined time period.

3. The computer-implemented method of claim 1, wherein the one or more network traffic flow parameters comprise: source IP address information, destination IP address information, source country information, source Autonomous System Number (ASN) information, protocol information, TCP flag information, Internet Control Message Protocol (ICMP) type information and packet size information for said traffic flow.

4. The computer-implemented method of claim 1, wherein the one or more user interface control components include a first GUI component providing for user selection of the filtering criteria.

5. The computer-implemented method of claim 1, wherein displaying the second set of data includes displaying the filtering criteria.

6. The computer-implemented method of claim 4, wherein displaying the second set of data includes displaying a second GUI component of the one or more user interface control components, the second GUI component providing for user removing the filtering criteria and re-displaying the first set of data.

7. A computer program product for monitoring control traffic in a network, the computer program product comprising:
one or more computer-readable storage devices and a plurality of program instructions stored on at least one of the one or more computer-readable storage devices, the plurality of program instructions comprising:
program instructions to monitor one or more network traffic flow parameters to detect a denial of service attack;
program instructions to display a first set of data in a graphical user interface (GUI), the first set of data representing a denial of service attack alert, wherein the denial of service attack alert comprises at least a first section representing alert summary information, a second section representing top traffic patterns associated with the denial of service attack alert, and a third section representing top contributing network elements associated with the denial of service attack alert, wherein the first section comprises at least alert duration, alert severity level and an IP address of the device targeted by the attack, and wherein the GUI includes one or more user interface control components;
program instructions to dynamically receive from a user, using the one or more user interface control components, filtering criteria comprising at least one of the one or more network traffic flow parameters identified as legitimate network traffic; and
program instructions to generate and display in the GUI a second set of data representing the denial of service attack alert based on the filtering criteria.

8. The computer program product of claim 7, wherein the program instructions to display the first set of data and the program instructions to display the second set of data include program instructions to display one or more graphs representing the relationship of network traffic volume and time for a predetermined time period.

9. The computer program product of claim 7, wherein the one or more network traffic flow parameters comprise: source IP address information, destination IP address information, source country information, source Autonomous System Number (ASN) information, protocol information, TCP flag information, Internet Control Message Protocol (ICMP) type information and packet size information for said traffic flow.

10. The computer program product of claim 7, wherein the program instructions to display the first set of data include program instructions to display a first GUI component of the one or more user interface control components, the first GUI component providing for user selection of the filtering criteria.

11. The computer program product of claim 7, wherein the program instructions to display the second set of data include program instructions to display the filtering criteria.

12. The computer program product of claim 10, wherein the program instructions to display the second set of data include program instructions to display a second GUI component of the one or more user interface control components, the second GUI component providing for user removing the filtering criteria and re-displaying the first set of data.

13. A computer-implemented method for monitoring traffic in a network, the method comprising:
monitoring, by a network monitoring probe, one or more network traffic flow parameters to detect a denial of service attack;
displaying a first set of data in a graphical user interface (GUI), in response to detecting the denial of service attack, the first set of data representing a denial of service attack alert, wherein the denial of service attack alert comprises at least a first section representing alert summary information, a second section representing top traffic patterns associated with the denial of service attack alert, and a third section representing top contributing network elements associated with the denial of service attack alert, wherein the first section comprises at least alert duration, alert severity level and an IP address of the device targeted by the attack, and wherein the GUI includes one or more user interface control components;
dynamically receiving from a user, using the one or more user interface control components, filtering criteria comprising at least one of the one or more network traffic flow parameters identified as legitimate network traffic; and
generating and displaying in the GUI a second set of data representing the denial of service attack alert wherein the one or more network traffic flow parameters identified as legitimate network traffic is removed from the monitored one or more network traffic flow parameters displayed in the second set of data via the GUI.

14. The computer-implemented method of claim 13, wherein the first and second sets of data include one or more graphs representing the relationship of network traffic volume and time for a predetermined time period.

15. The computer-implemented method of claim 13, wherein the one or more network traffic flow parameters comprise: source IP address information, destination IP address information, source country information, source Autonomous System Number (ASN) information, protocol information, TCP flag information, Internet Control Message Protocol (ICMP) type information and packet size information for said traffic flow.

16. The computer-implemented method of claim 13, wherein the one or more user interface control components include a first GUI component providing for user selection of the filtering criteria.

17. The computer-implemented method of claim 13, wherein displaying the second set of data includes displaying the filtering criteria.

18. The computer-implemented method of claim 17, wherein displaying the second set of data includes displaying a second GUI component of the one or more user interface control components, the second GUI component providing for user removing the filtering criteria and redisplaying the first set of data.

\* \* \* \* \*